United States Patent
Gammel et al.

(10) Patent No.: US 7,178,168 B2
(45) Date of Patent: Feb. 13, 2007

(54) SHIFT DEVICE AND METHOD FOR SHIFTING

(75) Inventors: Berndt Gammel, Markt Schwaben (DE); Franz Klug, Munich (DE); Oliver Kniffler, Munich (DE)

(73) Assignee: Infineon Technologies AG (DE)

( * ) Notice: Subject to any disclaimer, the term of this patent is extended or adjusted under 35 U.S.C. 154(b) by 193 days.

(21) Appl. No.: 10/893,161

(22) Filed: Jul. 16, 2004

(65) Prior Publication Data

US 2005/0041810 A1    Feb. 24, 2005

Related U.S. Application Data

(63) Continuation of application No. PCT/EP03/00181, filed on Jan. 10, 2003.

(30) Foreign Application Priority Data

Jan. 16, 2002   (DE) ............... 102 01 441

(51) Int. Cl.
*G06F 9/00*   (2006.01)
*H04L 11/00*  (2006.01)

(52) U.S. Cl. ............. 726/26; 726/34; 380/262; 380/268

(58) Field of Classification Search .......... 726/26, 726/34; 380/268, 262
See application file for complete search history.

(56) References Cited

U.S. PATENT DOCUMENTS 4,754,482 A * 6/1988 Weiss .................. 713/181
5,262,971 A * 11/1993 Yamaguchi ............ 708/209
5,363,449 A * 11/1994 Bestock ................ 705/72
6,097,818 A * 8/2000 Saito ................... 380/278
6,598,163 B1 * 7/2003 Jakobsson .............. 713/176

(Continued)

FOREIGN PATENT DOCUMENTS

EP       1 081 889 A2    3/2001

(Continued)

OTHER PUBLICATIONS www.archive.org, "Online!", XP002247737, Dec. 4, 2000.

(Continued)

*Primary Examiner*—Norman M. Wright
(74) *Attorney, Agent, or Firm*—Dickstein, Shapiro, LLP.

(57) ABSTRACT

A shift device for shifting a first place of a data word, which consists of a plurality of places, to a second place so as to obtain a shifted data word, wherein the first place is encrypted using a first encryption parameter and wherein the second place is encrypted using a second encryption parameter, includes a unit for shifting the first place of the data word to the second place of the data word, a unit for re-encrypting the first place from an encryption using the first encryption parameter into an encryption using the second encryption parameter, and a control for controlling the unit for shifting and the unit for re-encryption so that the first place is first shifted to the second place and is then re-encrypted, or that the first place is first re-encrypted and is then shifted to the second place. This ensures that data encrypted either with the first encryption parameter or with the second encryption parameter are always shifted, thus making it harder for attackers to eavesdrop on clear text data.

15 Claims, 3 Drawing Sheets

U.S. PATENT DOCUMENTS 6,606,385 B1 * 8/2003 Aikawa et al. ............... 380/28
6,735,291 B1 * 5/2004 Schmid et al. .............. 379/189
6,792,536 B1 * 9/2004 Teppler ..................... 713/178

FOREIGN PATENT DOCUMENTS

| WO | WO-99/60534 | 11/1999 |
| WO | WO-01/40950 A2 | 6/2001 |
| WO | WO-01/54083 A1 | 7/2001 |
| WO | WO 2004/014075 A2 * | 2/2004 |

OTHER PUBLICATIONS

Kuhn, M.G., "Cipher Instruction Search Attack on the Bus-Encryption Security Microcontroller DS5002FP", IEEE Transactions on Computers, 47(10):1153-1157, Oct. 1998.

* cited by examiner

SHIFT DEVICE AND METHOD FOR SHIFTING

CROSS-REFERENCE TO RELATED APPLICATIONS

This application is a continuation of co-pending International Application No. PCT/EP03/00181, filed Jan. 10, 2003, which designated the United States and was not published in English, and is herein incorporated by reference in its entirelty.

BACKGROUND OF THE INVENTION

1. Field of the Invention

The present invention relates to computational units and in particular to a shift device for shifting a first place of a data word, which consists of a plurality of places, to a second place so as to obtain a shifted data word.

2. Description of the Related Art

In typical CPUs the shift operation represents an important function. Using it, multiplication or division algorithms, e.g., can be implemented. Known CPUs work with clear text data, which can be shifted or rotated by n positions to the left or right. Different shift units, e.g. barrel shifters or logarithmic shifters, are available for this purpose. In general the unit is a permutator, which brings an arbitrary bit from position i to position j.

A disadvantage of such shift devices for known CPUs is that they only operate correctly with clear text data. As a result, attack possibilities become relevant which are based on probing or on a simple power analysis (SPA) or on a differential power analysis (DPA). To improve the security in processors against such attacks, a bus encryption has already been introduced. This means that data transmitted on buses are encrypted and before being fed into the CPU are decrypted in order that the CPU can perform correct computational operations in clear text space. The result of an operation is then encrypted again and is transmitted in encrypted form over a bus either to a cache or to an external memory (external as far as the CPU is concerned).

In this way it is made impossible for an attacker to monitor data which are transported on an internal bus since, should he attempt to do so, he would receive only the encrypted data. However, if the attacker attacks the input or output of the computational unit or intermediate states in the computational unit, he can monitor clear text data since the computational unit operates in clear text space. Although the structures to be monitored are considerably smaller and less regular here than bus structures, this nevertheless represents a point of attack.

SUMMARY OF THE INVENTION

It is the object of the present invention to provide a secure concept for shifting data.

In accordance with a first aspect, the present invention provides a shift device for shifting a first place of a data word, which consists of a plurality of places, to a second place so as to obtain a shifted data word, wherein the first place is encrypted using a first encryption parameter and wherein the second place is encrypted using a second encryption parameter, having a unit for shifting the first place of the data word to the second place of the data word; a unit for re-encrypting the first place from an encryption using the first encryption parameter into an encryption using the second encryption parameter; and a control unit for controlling the unit for shifting and the unit for re-encryption so that the first place is first shifted to the second place and is then re-encrypted, or that the first place is first re-encrypted and is then shifted to the second place.

In accordance with a second aspect, the present invention provides a method for shifting a first place of a data word, which consists of a plurality of places, to a second place so as to obtain a shifted data word, wherein the first place is encrypted using a first encryption parameter and wherein the second place is encrypted using a second encryption parameter, with the steps of shifting the first place of the data word to the second place of the data word and re-encrypting the shifted first place from an encryption using the first encryption parameter into an encryption using the second encryption parameter; or re-encrypting the first place from an encryption using the first encryption parameter into an encryption using the second encryption parameter and shifting the unencrypted place of the data word to the second place of the data word.

The present invention is based on the finding that the shift operation must be performed in secret text space, i.e. with encrypted data, to avoid the points of attack where data are available in clear text space. Since different places of the data word are differently encrypted, there must, in addition to a shift operation of a first place of a data word to a second place of a data word, also be a re-encryption such that the place of the data word which is fed into the shift device encrypted with an encryption parameter for the first place leaves the shift device encrypted with the encryption parameter for the second place. To this end a re-encryption device for re-encrypting the first place from an encryption using the first encryption parameter to an encryption using the second encryption parameter is provided. The sequence of the shift operation and re-encryption operation is, in principle, arbitrary. Thus it is possible to first re-encrypt the first place and then to shift it. Alternatively, however, the first place can first be shifted and then re-encrypted.

The re-encryption is preferably so performed that no clear text data arise during the re-encryption. This is achieved in that decryption of the first place into the clear text space using the first encryption parameter and encryption of the first place in clear text space using an encryption parameter for the second place are combined in one operation wherein there are no clear text data as intermediate results.

Preferably the encryption algorithm takes the form of a bitwise XOR or XNOR operation with an encryption parameter, the encryption parameters for the individual places of the data word being independent of one another. Reversal of the XOR operation or the XNOR operation corresponds again to the XOR or XNOR operation. Re-encryption from an encryption with a first encryption parameter into an encryption with a second encryption parameter can be achieved for the XOR operation using simple circuitry and in a modest amount of space by calculating a re-encryption key which corresponds to an XORing or XNORing of the first encryption parameter and the second encryption parameter. Re-encryption is then achieved by XORing or XNORing the first place of the data word, encrypted with the first encryption parameter, with the re-encryption key so as to provide a data word place which is encrypted with the second encryption parameter for the second place. The XORing or XNORing with the re-encryption key does not produce any clear text data, so there is no chance that an attacker can monitor clear text data at any place of the shift device.

For encryption any reversible algorithm can be used. For reasons of speed, however, XOR or XNOR encryption is preferred.

According to the present invention only encrypted data are shifted. This severely restricts the attack possibilities.

BRIEF DESCRIPTION OF THE DRAWINGS

These and other objects and features of the present invention will become clear from the following description taken in conjunction with the accompanying drawings, in which.

DESCRIPTION OF THE PREFERRED EMBODIMENTS

Figure 1:
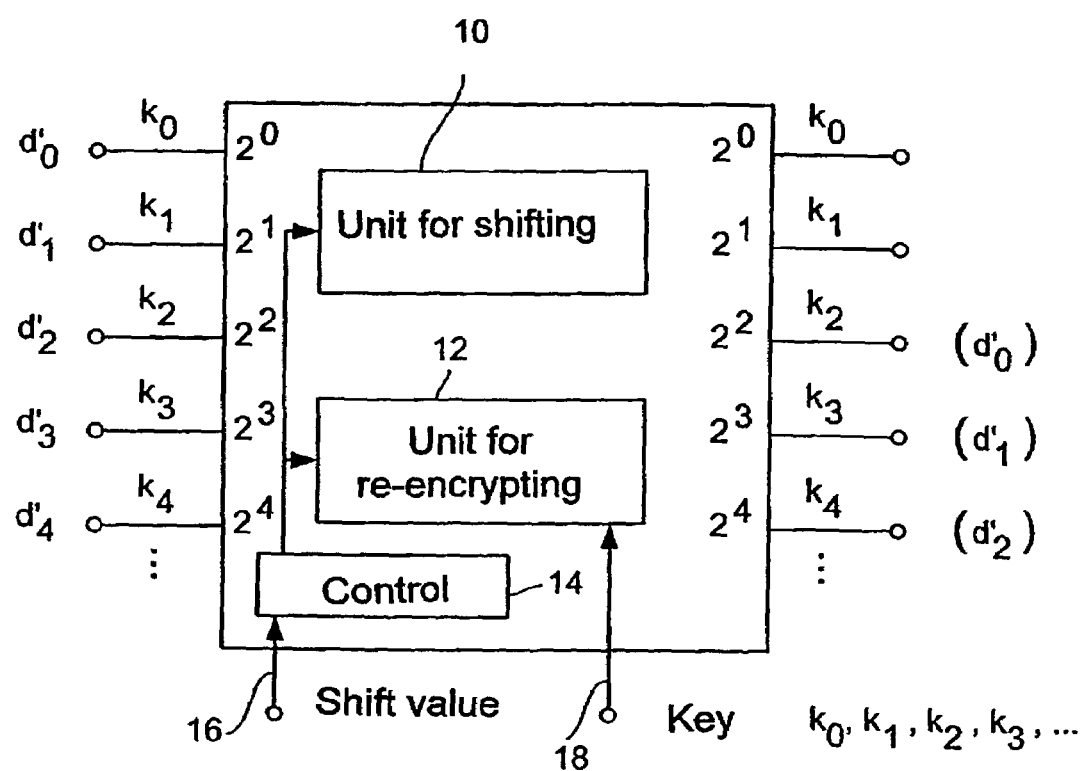
FIG. 1 shows a block diagram of a shift device according to the present invention.

FIG. 1 shows a shift device according to the present invention having a plurality of inputs for encrypted places $d_0'$, $d_1'$, ... of a data word which comprises one or more encrypted places $d_0'$, .... Each input has a particular weight, e.g. the weights $2^0$, $2^1$, ... in the binary number system shown in FIG. 1. Furthermore, each place of the data word d is encrypted via an encryption parameter $k_0$, $k_1$, $k_2$, ... assigned to this place. This means that the place of the data word $d_0'$ is encrypted with the encryption parameter $k_0$, while the place of the data word $d_3'$ e.g. is encrypted not with the encryption parameter $k_0$ but with the encryption parameter $k_3$. It should be noted that encrypted values are marked with an apostrophe.

The device according to the present invention also includes a unit 10 for shifting a first place of the data word to a second place of the data word, a unit 12 for re-encrypting the first place from an encryption using the encryption parameter for the first place into an encryption using the encryption parameter assigned to the second place. The shift device according to the present invention also has a control unit 14, which performs a sequence control of the unit for shifting 10 and the unit for re-encryption 12 such that either the first place is first shifted to the second place and re-encryption then occurs, or that the encrypted first place of the data word is first re-encrypted and the re-encrypted value is then shifted to the second place. The controller 14 can be can be fed via a controller input 16 with a shift value which specifies by how many places a word or a place of a word should be shifted. The unit 12 for re-encryption also includes a key input 18 via which it can receive the keys for the various places. i.e. the encryption parameters which are assigned to the individual places or inputs.

The shift device according to the present invention also has a plurality of outputs which are assigned a certain weight $2^0$, $2^1$, $2^2$ ... and which, like the inputs, are assigned the encryption parameters $k_0$, $k_1$, ....

In the following the shifting of a data word is explained by means of an example and making reference to FIG. 1. It is assumed that the encrypted data word d' has three places, namely $d_0'$, $d_1'$ and $d_2'$. The shift value entered at input 16 is +2, i.e. the three places of the encrypted data word at the input of the unit shown in FIG. 1 are each to be shifted by two places to the right, i.e. to higher-value places. For this the unit 12 for re-encryption requires the re-encryption keys for the places involved, i.e. $k_0$, $k_1$, and $k_2$, since these are the places of the input data word which are affected by the shift operation, and also the keys $k_3$ and $k_4$, since these are the places which are newly occupied as a result of the 2-bit shift to the right.

For the example it is assumed that the data are bitwise XOR encrypted with the respective encryption parameters, i.e. $d_i' = d_i$ XOR $k_i$. In principle, however, any other reversible encryption method could be used.

The re-encryption key for re-encrypting the first place $d_0'$ from the weight $2^0$ to the weight $2^2$ is equal to an XOR gating of $k_0$ with $k_2$. The re-encryption key for the input place with the weight $2^1$ is, by analogy, $k_1$ XOR $k_3$. Finally the re-encryption key for shifting the input data bit $d_2'$ is $d_2'$: $d_{24} = k_2$ XOR $k_4$. In principle it is unimportant whether the data are first re-encrypted and then shifted or whether the data are first shifted and then re-encrypted. At all events, it is ensured that only encrypted data are shifted. This is particularly important for larger shifters, since lines from an input to an output may be of considerable length and thus relatively easy to monitor. The shift device according to the present invention ensures, however, that only encrypted data (either according to the input sided encryption parameter or according to the output sided encryption parameter) are shifted. Although re-encryption is preferably so performed that no clear text data are computed during re-encryption (in this case there is no longer a point of attack on clear text data), nevertheless an increase in security is also achieved in the case where re-encryption is effected as follows: firstly a decryption takes place using the first encryption parameter and then an encryption using a second encryption parameter, clear text data existing between decryption and encryption. In this case, too, only encrypted data are shifted and the clear text data appear only within the re-encryption unit. Eavesdropping on these data, e.g. by probing, is incomparably more difficult than eavesdropping on data which are shifted unencrypted.

It should be noted that FIG. 1 shows a shifting of all bits by one position simply to serve as an example. The shifter according to the present invention can function as a general permutator wherein any bits are brought to any places, the appropriate re-encryption always being taken into account, so that the correct key base exists. In a permutator the situation can also arise that a bit is not shifted. In this case there is no need to re-encrypt anything.

Figure 2:
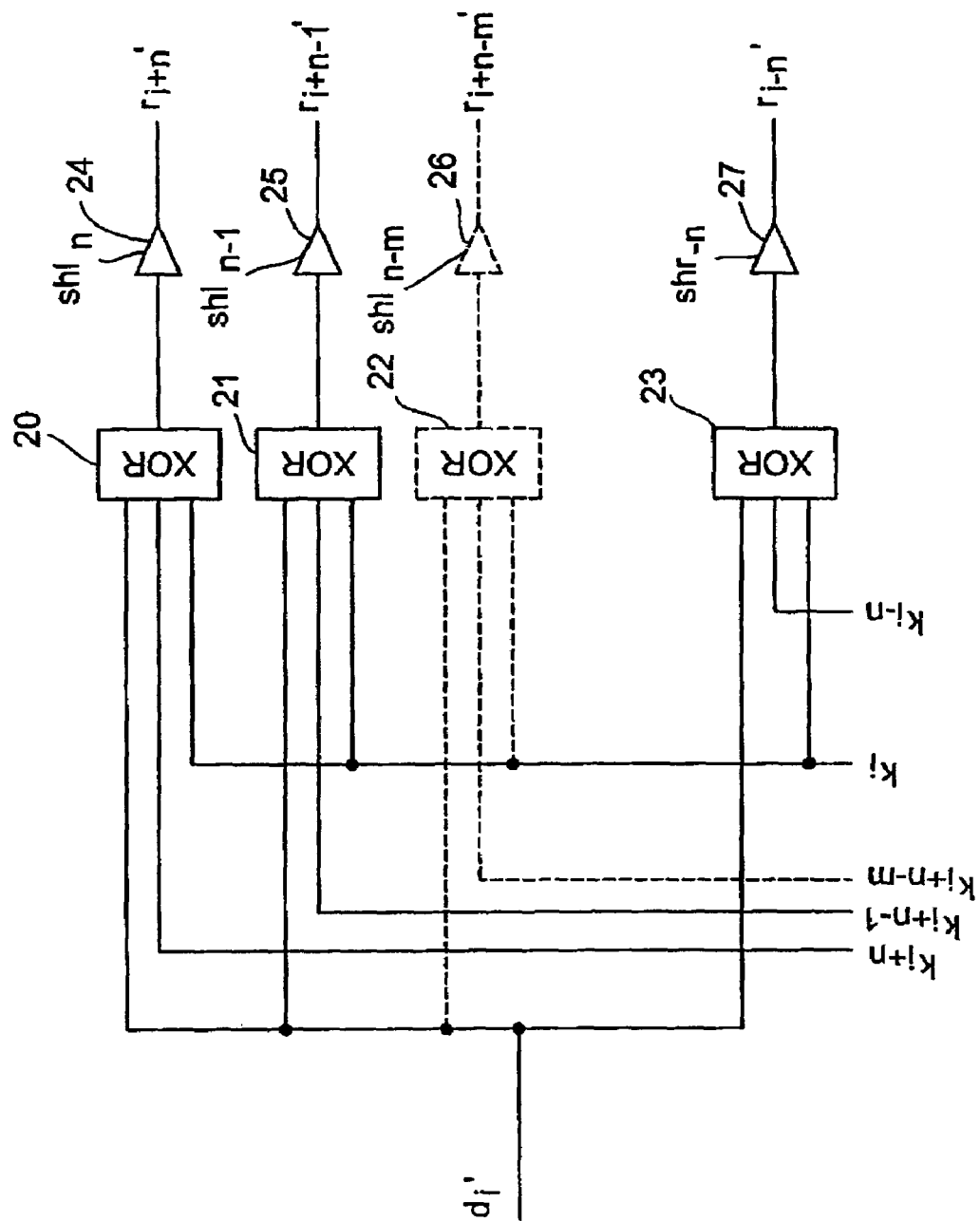
FIG. 2 shows a shift device according to a preferred embodiment of the present invention, wherein re-encryption is performed before shifting.

FIG. 2 shows a preferred embodiment for a shift device according to the present invention with bitwise XOR encryption and re-encryption prior to shifting. In particular FIG. 2 shows a bit slice, namely for the encrypted bit of the input data word $d_1'$. The re-encryption unit contains a number of XOR gates 20, 21, 22 and 23. The unit for shifting has a number of shift units which make it possible to shift to the left (SHL) or to the right (SHR). The principle of an encrypted barrel shifter shown in FIG. 2 requires additionally for each bit (n−1) triple XOR gates. For a 32-bit CPU this would entail an additional investment of 32×(n−1) triple XOR gates, the number n indicating the maximum number of places it is possible to shift to the left or to the right.

Figure 3:
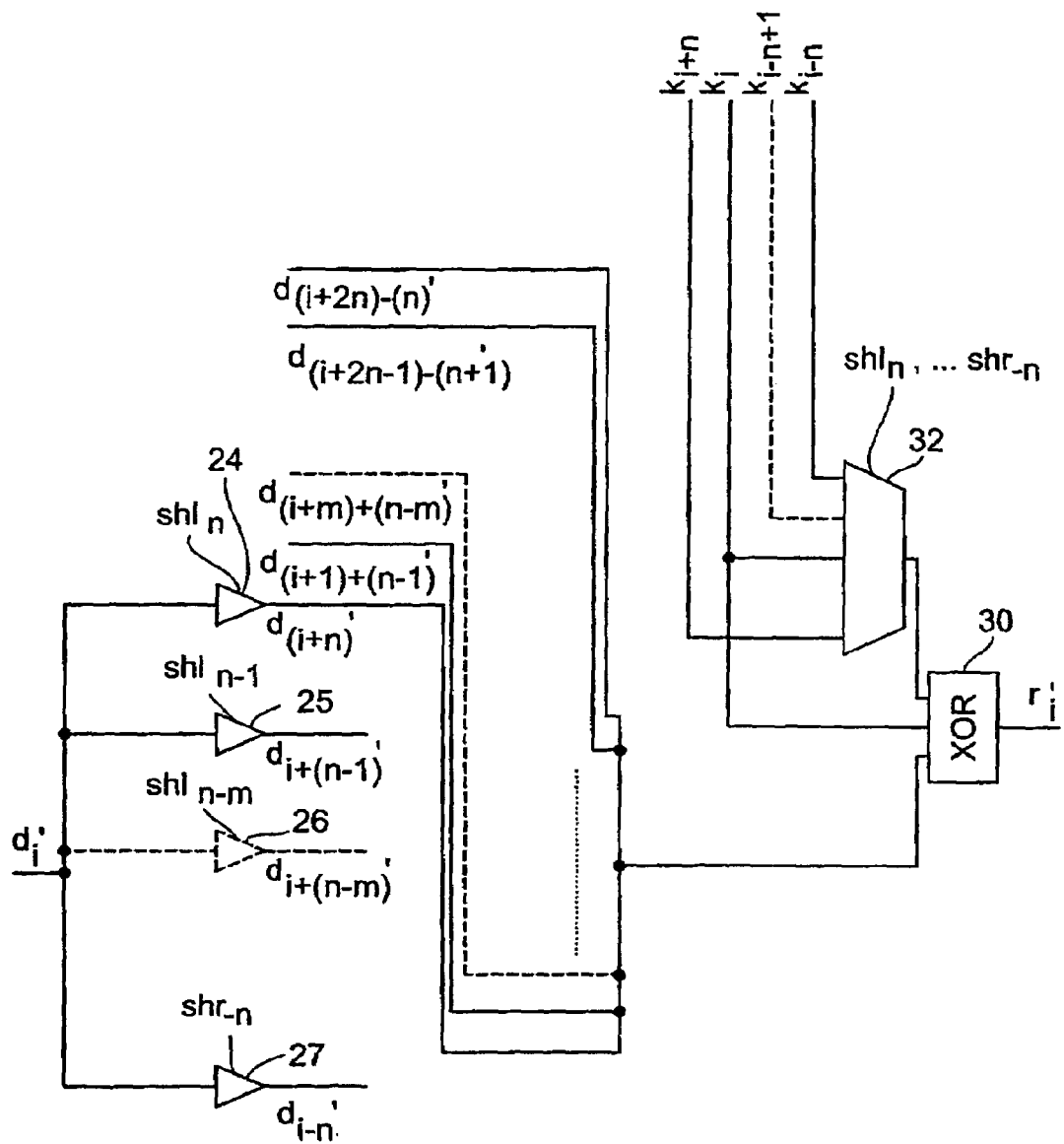
FIG. 3 shows a block diagram of a preferred embodiment of the present invention, wherein re-encryption is performed after shifting.

Instead of a re-encryption before the shift operation, as is shown in FIG. 2, a re-encryption after the shift operation can also be achieved. This is shown in FIG. 3 in terms of a bit slice for an encrypted place $d_i'$ of the data word. Firstly the encrypted value $d_i'$ is shifted by n bits and is then re-encrypted using the appropriate re-encryption key. The notation $d_{(i+2n)-(n)}'$ signifies that the data bit at place i+2n has been shifted n positions to the right. This intermediate result is still required for the re-encryption operation with the re-encryption key $t_{ij}$, which results from an XORing of the two encryption parameters for the two places involved, namely that of the origin and that of the target. The equation for the resulting bit is:

$$r_j' = (d_i' << n) \text{XOR } t_{ij}$$

This solution requires an additional triple XOR gate 30 and an n-in-1 multiplexer 32 for each bit of the result $r_i$. In addition, as was the case in FIG. 2, shift units 24, 25, 26 and 27, equivalent to the corresponding elements in FIG. 2, are needed.

It is to be noted that a variety of shift algorithms can be implemented on the basis of the previous details, e.g. logarithmic shifters, etc. A special shift operation is the rotation of a word. If a data word is to be rotated by one place to the right, this means that the least significant bit (lsb) of the data word prior to the rotation becomes the most significant bit (msb) of the data word after the rotation. The first place is then the least significant bit of the data word and the second place is the most significant bit of the data word. The re-encryption key is then the result of gating the encryption parameter for the most significant bit and the encryption parameter for the least significant bit.

The shifter according to the present invention can also be employed in combination with a complete ALU which calculates with encrypted data to perform more complex operations such as extracting k bits from a register and inserting them in another register in some other bit position. Expressed generally, the shifter according to the present invention functions as a permutator which can transpose bit positions quite arbitrarily. In particular, in a general permutator the case may arise that particular bit positions are shifted, and must thus be re-encrypted, while other bit positions are not shifted, and thus do not need to be re-encrypted.

There are different possibilities as to how the bits which are freed by shifting are to be treated, e.g. the bits with the weight $2^0$ and $2^1$ from FIG. 1. If—in clear text space—zeros are to be inserted, the zeros in the secret text space must be encrypted with the keys $k_0$ for the least significant place and $k_1$ for the more significant place. If, on the other hand, e.g. for reasons of sign, ones are introduced, these ones would likewise have to be encrypted with the keys for the corresponding places. Furthermore, if the shift value itself is encrypted, e.g. using its own encryption parameter or an encryption parameter for the inputs, an attacker would no longer even have the possibility of establishing whether or by how much shifting has occurred. Since inserted zeros or ones on unneeded or freed bit lines are also encrypted, it is not easy to perceive what has taken place within the encrypted shifter.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A shift device for shifting a first place of a data word, which consists of a plurality of places, to a second place so as to obtain a shifted data word, wherein the first place is encrypted using a first encryption parameter and wherein the second place is encrypted using a second encryption parameter, comprising:
    a shifter for shifting the first place of the data word to the second place of the data word;
    a re-encrypter for re-encrypting the first place from an encryption using the first encryption parameter into an encryption using the second encryption parameter; and
    a controller for controlling the shifter and the re-encrypter so that the first place is first shifted to the second place and is then re-encrypted, or that the first place is first re-encrypted and is then shifted to the second place.

2. A shift device according to claim 1, wherein the encryption of the first place and the second place is performed using the same encryption algorithm, while the first and the second encryption parameters are different.

3. A shift device according to claim 2, wherein the encryption algorithm involves an XORing or XNORing of the unencrypted first or second place with an encryption parameter, and wherein the re-encrypter is arranged to perform an XORing or XNORing of the encrypted first place with a re-encryption parameter which is equal to an XORing or XNORing of the first and the second encryption parameter.

4. A shift device according to claim 3,
    wherein the re-encrypter has an XNOR or an XOR gate with three inputs, a first input, to which a encrypted place can be applied, a second input, to which the first encryption parameter can be applied, and a third input, in which the second encryption parameter can be applied.

5. A shift device according to claim 2, wherein the data word is a binary number, wherein a place of the data word is a bit, und wherein XORing or XNORing consists of bitwise XORing or XNORing.

6. A shift device according to claim 1,
    wherein the shifter has a multiplexer for each place.

7. A shift device according to claim 1,
    wherein the re-encrypter is so arranged as to perform re-encryption without an intermediate result being created in which the first place is unencrypted.

8. A shift device according to claim 1, further comprising:
    an inserter for inserting a value into a place of the data word which was occupied before shifting the place but is no longer occupied after shifting the place.

9. A shift device according to claim 8, wherein the inserter for inserting the value is arranged to encrypt a value for insertion with the encryption parameter for this place, and to insert the value for insertion in encrypted form.

10. A shift device in accordance with claim 1, wherein the re-encrypter is operative to re-encrypt the first place of the data word such that a decryption of the re-encrypted first place of the data word to obtain a plaintext second place of the data word is possible using the second encryption parameter and without using the first encryption parameter.

11. A method for shifting a first place of a data word, which consists of a plurality of places, to a second place so as to obtain a shifted data word, wherein the first place is encrypted using a first encryption parameter and wherein the second place is encrypted using a second encryption parameter, with the following steps:
    shifting the first place of the data word to the second place of the data word and re-encrypting the shifted first place from an encryption using the first encryption parameter into an encryption using the second encryption parameter; or re-encrypting the first place from an encryption using the first encryption parameter into an encryption using the second encryption parameter and shifting the unencrypted place of the data word to the second place of the data word.

12. A shift device for shifting a first place of a data word, which consists of a plurality of places, to a second place so as to obtain a shifted data word, wherein the first place is encrypted using a first encryption parameter and wherein the second place is encrypted using a second encryption parameter, comprising:
   a shifter for shifting the first place of the data word to the second place of the data word, wherein the shifter has a multiplexer for each place;
   a re-encrypter for re-encrypting the first place from an encryption using the first encryption parameter into an encryption using the second encryption parameter;
   a controller for controlling the shifter and the re-encrypter so that the first place is first shifted to the second place and is then re-encrypted, or that the first place is first re-encrypted and is then shifted to the second place; and
   an inserter for inserting a value into a place of the data word which was occupied before shifting the place but is no longer occupied after shifting the place, the inserter being arranged to encrypt a value for insertion with the encryption parameter for this place, and to insert the value for insertion in encrypted form.

13. A shift device for shifting a first place of a data word, which consists of a plurality of places, to a second place so as to obtain a shifted data word, wherein the first place is encrypted using a first encryption parameter and wherein the second place is encrypted using a second encryption parameter, wherein the encryption of the first place and the second place is performed using the same encryption algorithm, while the first and the second encryption parameters are different, wherein the encryption algorithm involves an XORing or XNORing of the unencrypted first or second place with an encryption parameter, comprising:
   a shifter for shifting the first place of the data word to the second place of the data word;
   a re-encrypter for re-encrypting the first place from an encryption using the first encryption parameter into an encryption using the second encryption parameter, wherein the re-encrypter is arranged to perform an XORing or XNORing of the encrypted first place with a re-encryption parameter which is equal to an XORing or XNORing of the first and the second encryption parameter, wherein the re-encrypter has an XNOR or an XOR gate with three inputs, a first input, to which a encrypted place can be applied, a second input, to which the first encryption parameter can be applied, and a third input, to which the second encryption parameter can be applied; and
   a controller for controlling the shifter and the re-encrypter so that the first place is first shifted to the second place and is then re-encrypted, or that the first place is first re-encrypted and is then shifted to the second place.

14. A shift device for shifting a first place of a data word, which consists of a plurality of places, to a second place so as to obtain a shifted data word, wherein the first place is encrypted using a first encryption parameter and wherein the second place is encrypted using a second encryption parameter, comprising:
   a shifter for shifting the first place of the data word to the second place of the data word;
   a re-encrypter for re-encrypting the first place from an encryption using the first encryption parameter into an encryption using the second encryption parameter, wherein the re-encrypter is so arranged as to perform re-encryption without an intermediate result being created in which the first place is unencrypted; and
   a controller for controlling the shifter and the re-encrypter so that the first place is first shifted to the second place and is then re-encrypted, or that the first place is first re-encrypted and is then shifted to the second place.

15. A shift device for shifting a first place of a data word, which consists of a plurality of places, to a second place so as to obtain a shifted data word, wherein the first place is encrypted using a first encryption parameter and wherein the second place is encrypted using a second encryption parameter, comprising:
   a shifter for shifting the first place of the data word to the second place of the data word;
   a re-encrypter for re-encrypting the first place from an encryption using the first encryption parameter into an encryption using the second encryption parameter; and
   a controller for controlling the shifter and the re-encrypter so that the first place is first shifted to the second place and is then re-encrypted, or that the first place is first re-encrypted and is then shifted to the second place.

* * * * *

UNITED STATES PATENT AND TRADEMARK OFFICE
CERTIFICATE OF CORRECTION

| | | |
|---|---|---|
| PATENT NO. | : 7,178,168 B2 | Page 1 of 1 |
| APPLICATION NO. | : 10/893161 | |
| DATED | : February 13, 2007 | |
| INVENTOR(S) | : Berndt Gammel et al. | |

It is certified that error appears in the above-identified patent and that said Letters Patent is hereby corrected as shown below:

In the Claims:

In Claim 5, column 6, line 34, "und" should read --and--

Signed and Sealed this

Tenth Day of April, 2007

JON W. DUDAS
*Director of the United States Patent and Trademark Office*